R. H. WAPPLER.
CYSTOSCOPE.
APPLICATION FILED JAN. 21, 1911.
1,021,809.
Patented Apr. 2, 1912.
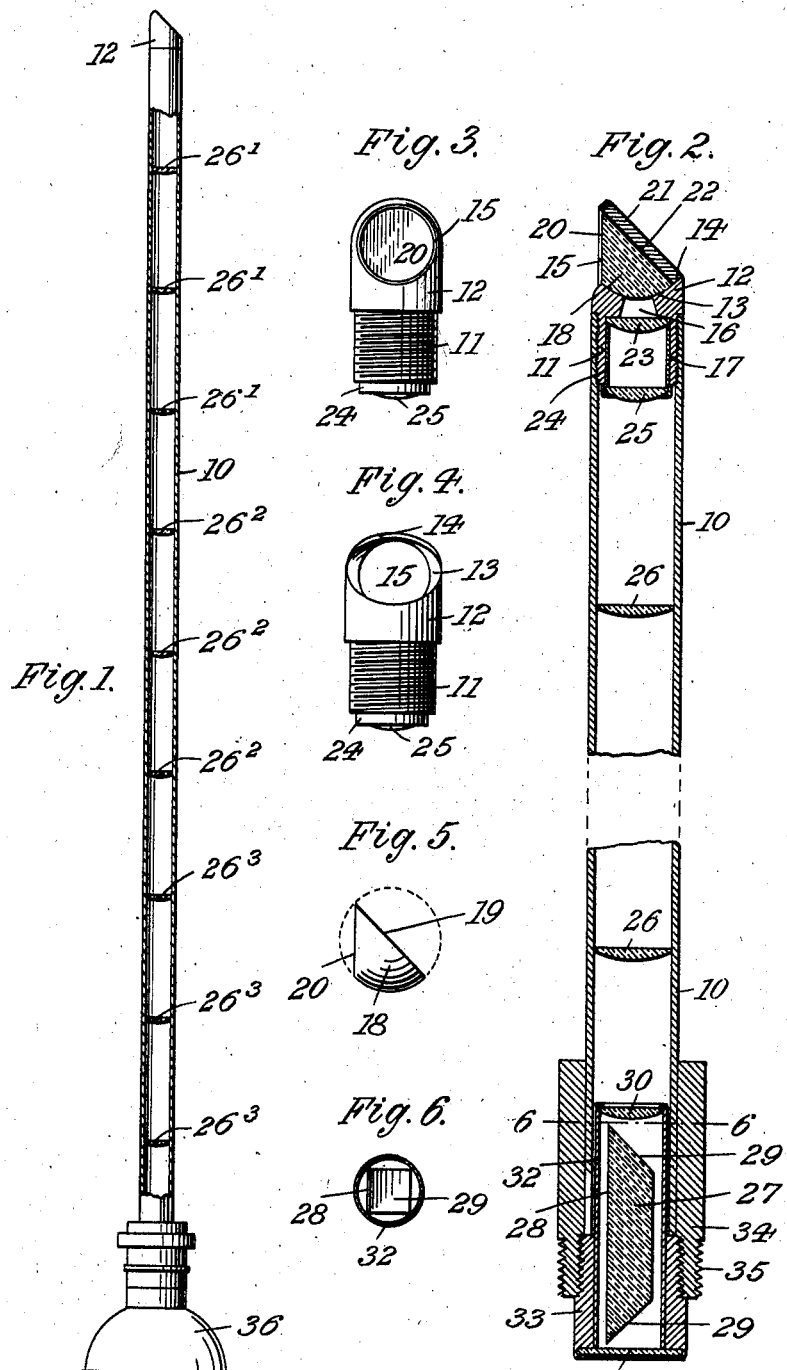

UNITED STATES PATENT OFFICE.

REINHOLD H. WAPPLER, OF NEW YORK, N. Y., ASSIGNOR TO AMERICAN CYSTOSCOPE MAKERS, INC., OF NEW YORK, N. Y., A CORPORATION.

CYSTOSCOPE.

1,021,809.  Specification of Letters Patent.  Patented Apr. 2, 1912.

Application filed January 21, 1911. Serial No. 603,794.

*To all whom it may concern:*

Be it known that I, REINHOLD H. WAPPLER, a citizen of the United States, residing at New York city, county and State of New York, have invented a new and Improved Cystoscope, of which the following is a specification.

This invention relates to cystoscopes and similar optical instruments intended to be used for making examinations of inner parts of the human body which are not directly accessible to the eye of the physician.

The invention comprises more particularly novel and effective means for enlarging the angle of vision of the instrument and for simultaneously increasing the luminosity of the image produced, so that an extended rapid and minute observation of the affected parts may take place. For obtaining this result, an objective system is employed which embraces a refracting and reflecting convex lens, and preferably, a pair of coöperating additional lenses all of which are mounted in a common socket secured to one end of the catheter or cystoscope tube. The latter contains a plurality of reversing systems, each comprising three lenses, whereby the illumination of the image is greatly increased. The ocular system secured to the other end of the tube comprises a magnifying lens and a prism to produce the desired rightsided and upright picture.

In the accompanying drawing: Figure 1 is an elevation partly in section of a cystoscope embodying my invention; Fig. 2 an enlarged longitudinal section partly broken away and with some of the parts omitted; Fig. 3 a front view of the objective socket; Fig. 4 a rear view thereof with the refracting and reflecting lens removed; Fig. 5 a side view of said lens, and Fig. 6 a cross section through the prism holding tube on line 6—6, Fig. 2.

Into one end of a tube 10 is screwed the reduced threaded end 11 of a socket 12. The latter is provided with a bore 13 that constitutes part of a sphere and merges into a cylindrical bore 14 of like diameter, the axis of said cylindrical bore extending at an angle of approximately 45° to that of the tube. At its front, socket 12 is provided with a circular fenestral opening 15 extending substantially parallel to the axis of tube 10 and located diametrically opposite bore 14. Bore 13 communicate through central aperture 16 with a cylindrical central recess 17 of the socket. Into bore 13 is fitted a convex lens 18 which is obtained by first grinding a true hemi-spherical lens, the diameter of which equals that of bores 13, 14 and by then providing the same with a plane 20 that intersects the plane base 19 of the lens at the periphery thereof and extends at an angle of about 45° thereto, the whole thus forming jointly a wedge-like body cut from a sphere. In mounting the lens, its convex surface is brought into contact with bore 13 and it is so placed that the light-admitting plane 20 extends flush with the fenestral opening 15, while the light-reflecting plane 19 is alined with the boundary between bores 13, 14. Lens 18 is held in position by a disk 21 jammed into bore 14, and engaging plane 19 which is preferably provided with a layer 22 of metallic silver or other light-reflecting medium. Into recess 17 is fitted a lens 23 shown to be held in position by a stepped sleeve 24 carrying at its outer end a lens 25.

By the construction described, the parts may be readily assembled, while owing to the engagement of the convex lens with the correspondingly curved bore 13 of socket 12 the entrance of water, etc., into the socket is effectively prevented.

Intermediate the objective and the ocular hereinafter more fully described, tube 10 contains two or more light carrying and reversing lens-aggregates or systems, each consisting of three properly spaced lenses 26, the drawing showing the tube provided with three aggregates of lenses 26′, 26², 26³. The most advantageous number of reversing aggregates depends upon the diameter of the catheterizing tube, a narrow tube requiring a triple reversing system while a wide tube needs to be fitted with but a double reversing system. If, for instance, a thin tube is provided with three sets of light-carrying lenses, its illumination is almost normal, or in other words, there are as many lenses in the tube as would be required for making three telescopes, hence there will be carried nearly as much light through the tube as would otherwise pass through a tube of one-third its length.

The ocular comprises essentially a prism 27, the plane of its light-reflecting base 28 forming an angle of substantially 45° with the light-reflecting plane 19 of lens 18, while its refracting sides 29 extend from base 28 in a direction away from fenestral opening 15. In other words plane 20 of lens 18 and base 28 of prism 27 extend in substantial parallelism along one side of tube 10. Intermediate prism 27 and the light-carrying systems 26, is arranged a magnifying lens 30 while a plane protective outer glass 31 prevents any dust from entering the ocular.

By the construction described the image viewed by the physician is upright, right-sided and well illuminated, so that the instrument offers reliable and effective means for rapidly diagnosing urinary and other internal disorders. The above described mutual position of the biplano-spherical lens and the reversing prism depends of course upon the number of reversing systems used. If only two such systems are employed, prism 27 must be turned from the position shown in the drawing through an angle of 90° toward either side, to effect the proper turning of the pencils and to thus produce the desired upright rightsided image.

Prism 27 is tightly fitted into a sleeve 32 which is in turn embraced by a screw socket 33 tapped into a corresponding annulus 34 secured to tube 10, said annulus being threaded as at 35 for the attachment of an eye tube 36. Into an outer recess of socket 33 is fitted the plane protective glass 31 while the inner end of sleeve 32 carries the magnifying lens 30 hereinabove referred to.

It is obvious that changes may be made in arranging and mounting the constituent parts of the objective and ocular systems without departing from the spirit of my invention.

As already stated, there is obtained by the instrument a true, rightsided luminous image of the part inspected, while furthermore the angle of vision is greatly enlarged, so that an extensive surface is viewed, without necessitating an objectionable shifting or turning of the instrument.

I claim:

1. In an optical instrument of the class described, an objective socket having a bore that constitutes part of a sphere and a fenestral opening communicating with said bore, and a refracting and reflecting convex lens fitted into said bore the radius of curvature of the lens equaling substantially that of the bore.

2. In an optical instrument of the class described, an objective socket having a bore that constitutes part of a sphere and a fenestral opening communicating with said bore, a refracting and reflecting convex lens within the bore, the radius of curvature of the lens equaling substantially that of the bore and means for retaining the lens within the bore.

3. In an optical instrument of the class described, an objective socket having a fenestral opening and a communicating bore that constitutes part of a sphere and merges into a cylindrical bore, a refracting and reflecting convex lens fitted into the first named bore, and a disk fitted into the second named bore for retaining the lens in position.

4. In an optical instrument of the class described, an objective socket having a fenestral opening and a communicating bore that constitutes part of a sphere and merges into a cylindrical bore, a refracting and reflecting convex lens fitted into the first named bore, a disk fitted into the second named bore for retaining the lens in position, and a pair of additional lenses fitted into the socket and coöperating with the first named lens.

5. An optical instrument of the class described, composed of a tube, an objective socket tapped into one end thereof and having a fenestral opening and a communicating hemi-spherical bore that merges into a cylindrical bore, a hemi-spherical lens fitted into the spherical bore with its light-admitting plane flush with the window and with its reflecting plane alined with the boundary between the hemi-spherical and cylindrical socket-bores, a disk fitted into the cylindrical bore for retaining said lens in position, a pair of additional lenses fitted into the socket and coöperating with the first named lens, a plurality of light-carrying and reversing lens-aggregates within the tube, an ocular socket tapped into the other end of said tube, a reversing prism within said socket, the base of which is so set relatively to the light-admitting plane of the first named lens that an upright rightsided image is obtained, and a magnifying lens intermediate the lens-aggregates and the prism.

REINHOLD H. WAPPLER.

Witnesses:
ARTHUR E. ZUMPE,
KATHERYNE KOCH.